United States Patent [19]

Mitchell

[11] 4,412,277
[45] Oct. 25, 1983

[54] AC-DC CONVERTER HAVING AN IMPROVED POWER FACTOR

[75] Inventor: Daniel M. Mitchell, Cedar Rapids, Iowa

[73] Assignee: Rockwell International Corporation, El Segundo, Calif.

[21] Appl. No.: 414,757

[22] Filed: Sep. 3, 1982

[51] Int. Cl.³ ........................................... H02P 13/00
[52] U.S. Cl. ...................................... 363/81; 363/89
[58] Field of Search ...................... 318/803; 328/26; 363/81, 84, 88, 89

[56] References Cited

U.S. PATENT DOCUMENTS

| | | | |
|---|---|---|---|
| 3,238,383 | 3/1966 | Falk | 328/26 X |
| 3,896,287 | 7/1975 | Cook | 363/79 X |
| 4,074,345 | 2/1978 | Ackermann | 363/81 X |
| 4,150,325 | 4/1979 | Miller et al. | 363/81 X |
| 4,245,293 | 1/1981 | Terunuma et al. | 363/79 X |

Primary Examiner—William M. Shoop

Attorney, Agent, or Firm—Richard K. Robinson; Howard R. Greenberg; H. Fredrick Hamann

[57] ABSTRACT

An AC to DC converter utilizes a first power converter for converting an AC signal to a DC signal under the control of a control signal. The control signal is generated by a control circuit that includes a first analog generator that provides a first signal that is analogous to the voltage of the AC signal that is to be converted. A second analog generator generates a second signal that is analogous to the current of the AC signal that is to be converted and a third analog generator generates a third signal that is analogous to the voltage of the DC output signal. The third signal and the first signal are multiplied together to obtain a fourth signal. The control signal is generated from the fourth signal and the second signal and is used to control the power converter such that the waveform of the current of the AC signal is limited to a sinusoidal waveform of the same frequency and phase as the AC signal.

8 Claims, 2 Drawing Figures

AC-DC CONVERTER HAVING AN IMPROVED POWER FACTOR

BACKGROUND OF THE INVENTION

This invention relates to AC-DC converters and in particular to AC-DC converters that provide a unity power factor to sinusoidal AC sources.

There are essentially two types of prior art AC-DC power converters; those that have a capacitor type input filter and those that have an choke type input filter. The AC to DC converters that have a capacitor type input filter have associated therewith peak charging currents for charging the capacitors that are located within the capacitor type input filter. The choke type input filters have squarewave currents which are detrimental to the power line that drives the AC to DC converter. In both cases, the conventional AC to DC converters produce input line currents that have undesirable harmonic contents that, if removed, must be done so by large power filters.

SUMMARY OF THE INVENTION

An AC to DC converter utilizes a first power converter for converting an AC signal to a DC signal under the control of a control signal. The control signal is generated by a control circuit that includes a first analog generator that provides a first signal that is analogous to the voltage of the AC signal that is to be converted. A second analog generator generates a second signal that is analogous to the current of the AC signal that is to be converted and a third analog generator generates a third signal that is analogous to the voltage of the DC output signal. The third signal and the first signal are multiplied together to obtain a fourth signal. The control signal is generated from the fourth signal and the second signal and is used to control the power converter such that the waveform of the current of the AC signal is limited to a sinusoidal waveform of the same frequency and phase as the AC signal.

The control signal is generated by the comparison of the fourth signal with the second signal to obtain a difference signal. The difference signal is then compared with a high frequency sawtooth waveform and is used to generate the control signal that is used to drive the AC to DC converter.

The AC to DC converter is a full wave AC to DC converter that is capable of being controlled by the control signal. This is accomplished by replacing any two diodes in adjacent legs of a conventional bridge configuration with FET switches which respond to the control signals. The selected FET switches that are used have associated therewith an intrinsic diodes which enables the bridge to be configured by two diodes and two FET switches.

During any given half cycle of operation at a much higher frequency than the AC signal, the FET switches will cycle on and off with a duty factor that varies in accordance with the control signal in order to achieve the same waveform for the current of the AC signal as the voltage waveform of the AC signal.

It is the object of the invention to disclose an AC to DC converter in which the input AC current is forced to have an identical waveform as the input AC voltage for any power level.

It is another object of the invention to provide an AC to DC converter in which the input current is confined to a waveform that is identical to the input voltage waveform and thus eliminate the necessity of large input power line filters.

It is yet another object of the invention to disclose an AC to DC converter in which the control signal that controls the converter is at a much higher frequency than the frequency of the AC signal that is to be converted.

BRIEF DESCRIPTION OF THE DRAWING

In order that the invention may be readily carried into practice, an embodiment will now be described in detail by way of example, with reference to the accompanying drawing in which.

DETAILED DESCRIPTION OF THE PREFERRED EMBODIMENT

Figure 1:
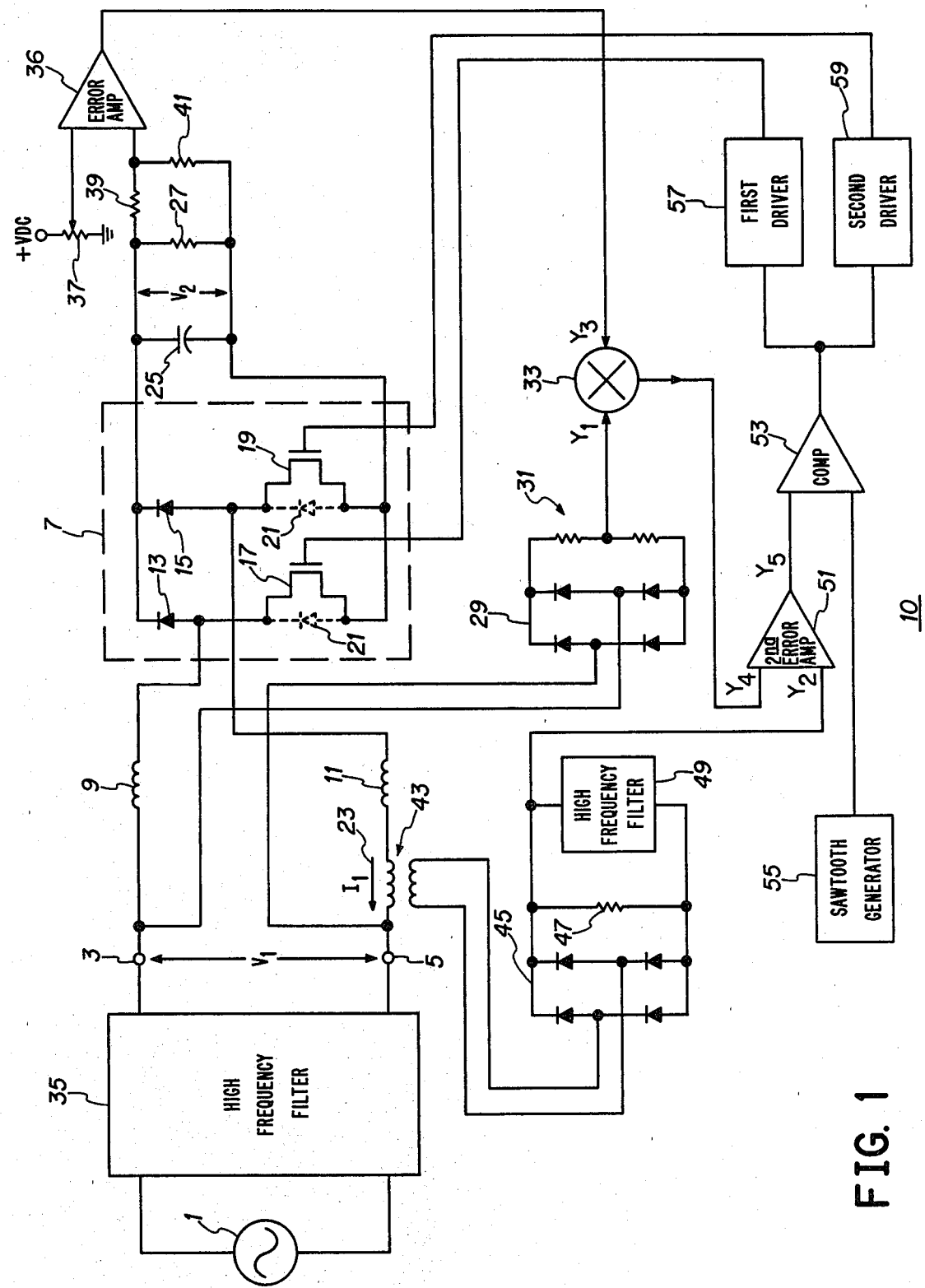
FIG. 1 is a schematic diagram of the AC to DC converter according to the invention.

In FIG. 1, to which reference should now be made, there is shown an AC to DC converter 10 according to the invention. An AC signal source 1 provides an AC signal via high frequency filter 35 across terminals 3 and 5 which is represented as a voltage $V_1$. The voltage $V_1$ is applied to a full wave rectifier 7 via chokes 9 and 11. The full wave rectifier 7 is a bridge configuration with two diodes 13 and 15 in two adjacent legs and two power MOSFET switches 17 and 19 in the other two adjacent legs. Associated with each power MOSFET switch is an intrinsic diode 21 represented by dash lines in the embodiment of FIG. 1. The embodiment of the converter illustrated in FIG. 1 has the advantage that it is not necessary to steer the power MOSFET's gate signals because the intrinsic diodes contact naturally when they are forward biased. The gating of the power MOSFETs 17 and 19 is performed at a frequency much higher than the frequency of the voltage $V_1$ with a duty factor that is varied in accordance with the control signal that is applied to the gates of the power MOSFETS switches 17 and 19 to insure the sinusoidal waveform of the input current $I_1$ which is represented by arrow 23. Duty factor is defined as the ratio of the time the power MOSFET's switches 17 and 19 are gated on in each period of the total time of each period. The output of the power converter 7 is applied across an output capacitor 25 across to which the output DC voltage $V_2$ is provided and applied to a load 27.

A full wave bridge rectifier 29 rectifies the voltage $V_1$ that is applied to the AC to DC converter and obtains an analog signal that is analogous to the voltage $V_1$. The $V_1$ analog signal is divided down by a resistor divider network 31 and applied to a multiplier 33. The $V_1$ analog signal is represented in FIG. 1 by the vector $Y_1$. An error amplifier 35 compares the output signal $V_2$ with a reference signal that is provided by a potentiometer 37 and a DC reference source (not shown). Resistor divider network 39 and 41 divide $V_2$ proportionally down for comparison with the reference signal that is provided from the wiper of potentiometer 37 to the error amplifier 35 and a signal $Y_3$ that is analogous to the output signal $V_2$ is obtained and applied to the multiplier 33 where it is multiplied with the analog signal $Y_1$ to form a current reference signal, $Y_4$. $Y_3$ by action of the multiplier 33 varies the amplitude of $Y_1$ to obtain $Y_4$.

The current that is provided by the voltage source $V_1$, illustrated in FIG. 1 as $I_1$, is sensed by a current sense transformer 43. The sensed signal is applied to a full wave rectifier 45 where an analogous voltage is developed across the output of the full wave rectifier 45 by a resistor 47. The high frequency ripple component of the voltage is filtered by a filter 49 and applied to a second error amplifier 51. The analog signal of the current provided by the AC source 1 is denoted $Y_2$ and is compared by an error amplifier 51 to $Y_4$ to obtain $Y_5$ which is the amplified difference between the two signals. $Y_5$ is then compared by a comparator 53 with a sawtooth waveform provided by the sawtooth generator 55 that results in a pulse being provided on the output of the comparator 53 for the period of time that the output signal from the sawtooth generator is greater than $Y_5$. A first driver 57 and a second driver 59 provide gating signals to the power MOSFETs 17 and 19 respectively.

The error amplifier 35 varies the sinusoidal amplitude of $I_1$ as necessary to keep the output voltage at $V_2$ level regardless of the input voltage $V_1$ or load and must be true for all switching rates of the power MOSFETs 17 and 19.

The second error amplifier 51 tries to achieve a zero error between the signals $Y_4$ and $Y_2$ by varying the duty factor of the power MOSFETs 17 and 19 and assures that the wave shape of current $I_1$ is the same as the voltage $V_1$.

The sawtooth generator provides a sawtooth waveform that has a frequency that is much higher than the input frequency provided by the AC source 1. In the preferred embodiments for a 60 Hz input AC signal the frequency of the sawtooth generator 55 is 40 KHz. This high frequency is removed from the AC to DC converter's 10 circuits by the high frequency filters 35 and 49.

Figure 2:
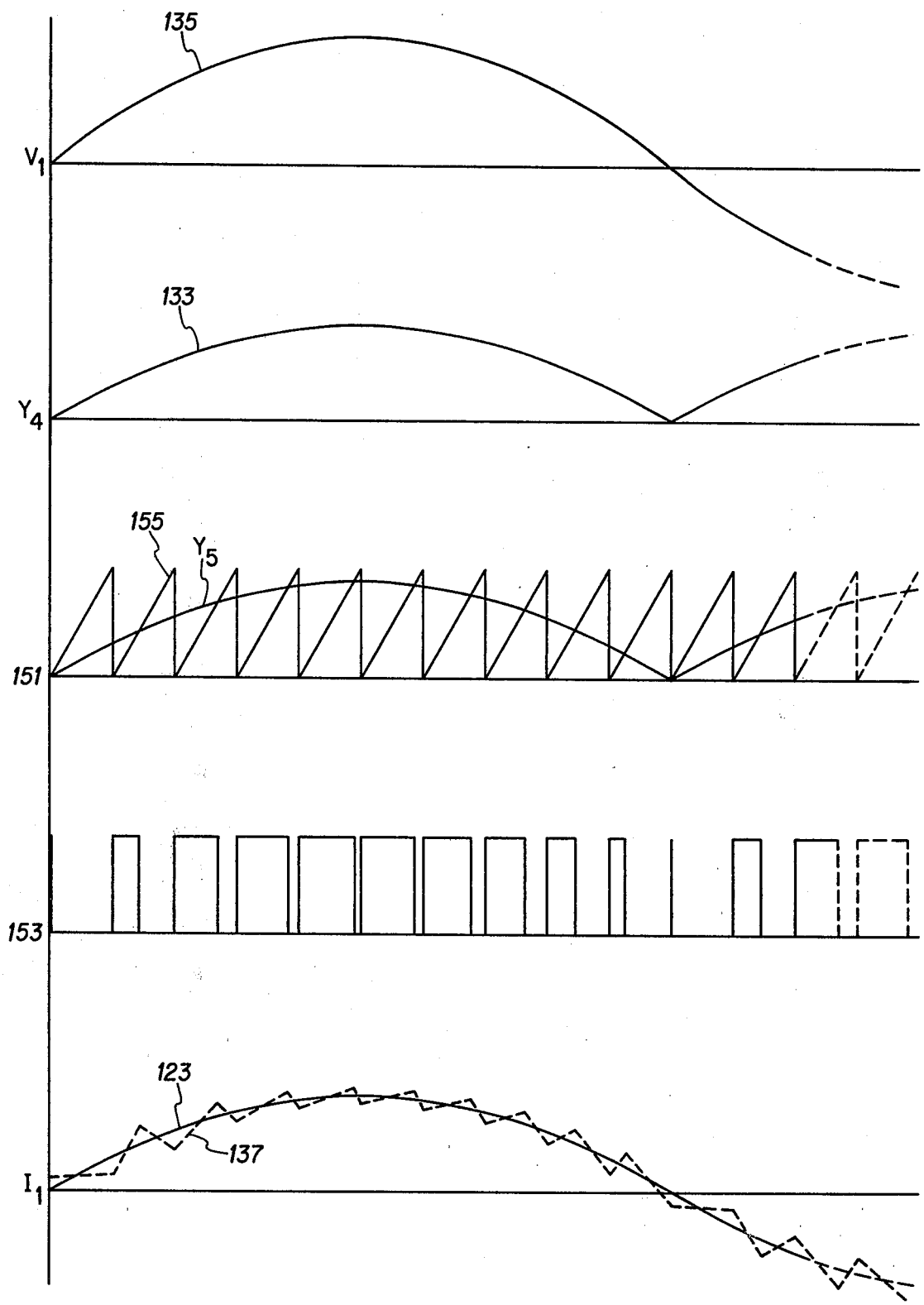
FIG. 2 is a waveform diagram that illustrates the operation of the AC to DC converter of FIG. 1.

The invention may be readily understood by referring to FIG. 2 in conjunction with FIG. 1. During a positive half cycle of the AC signal $V_1$, represented in FIG. 2 by waveform 135, current $I_1$ passes through the line chokes 9 and 11, intrinsic diode 21 of power MOSFET 19 and alternately at a high frequency rate through diode 13 and power MOSFET 17 depending upon the state of the gate signal from the first driver 57. The gate signal is represented by waveform 153 of FIG. 2. When power MOSFET 17 is gated on, $I_1$ builds up through line chokes 9 and 11; when power MOSFET 17 is off, the energy stored in the line chokes 9 and 11 is transferred to the output capacitor 25 via diode 13. The waveform for $I_1$ prior to being filtered by the high frequency filter 35 is represented by the waveform 137 and after filtering by the high frequency filter 35 the waveform for $I_1$ is represented by waveform 123 of FIG. 2. Similarly, power MOSFET 19 and diode 15 are activated during a negative half cycle of the AC signal $V_1$.

The power MOSFET 19 duty factor is determined by the comparison of the output signal $Y_5$ and the high frequency sawtooth reference signal from the sawtooth generator 55. This comparison is graphically illustrated by waveforms 151 and 153 of FIG. 2 where waveform 155 is the output of the sawtooth generator 55. The waveform 155 of FIG. 2 is at a much slower rate than the preferred embodiment of 40 kHz. This is for illustration purposes only so that the invention may be more clearly understood. Additionally, $V_1$ is illustrated as a sinusoidal waveform as is the waveform for $I_1$ however any waveform that is a function of time may be substituted for $V_1$ and consequently $I_1$ will follow that waveform due to the control of the conduction of the power MOSFETs 17 and 19. In the embodiment of FIG. 2, the conduction of the power MOSFET 19 is controlled in such a manner that the envelope of the resulting high frequency sawtooth waveform 137 of $I_1$ is sinusoidal flowing from terminal 3 and is in phase with $V_1$. The line chokes 9 and 11 are designed so that the peak to peak sawtooth amplitude of $I_1$ is about one tenth the peak line frequency value in order to minimize the size of the high frequency input filter 35. During a given high cycle at the frequency of $V_1$, the high frequency operation of either power MOSFET 17 and diode 13 insures that the steady state value of $V_2$ is equal to or greater than the peak value of $V_1$.

Many changes and modifications in the above described invention can, of course, be carried out without departing from the scope thereof. Accordingly, the invention is intended to be limited only by the scope of the appended claims.

I claim:

1. A converter circuit for converting an AC signal to a DC signal comprising:
    controllable converter means controlled by a control signal for controlling the phase and frequency of the current of the AC signal and the DC signal level;
    first reference signal generator means for generating a first reference signal from the current of the AC signal;
    second reference signal generator means for generating a second reference signal from the DC signal and the voltage of the AC signal; and
    control signal generator means for generating the control signal from the first reference signal and the second reference signal.

2. The converter circuit according to claim 1 wherein the first reference signal generator means comprises:
    current sensor means for sensing the current of the AC signal to obtain a sensed current signal;
    first analog generator means for generating a first signal from the current sensed signal that is analogous to the current of the AC signal; and
    converter means for converting the first signal to the first reference signal.

3. The converter circuit according to claim 1 wherein the second reference signal generator means comprises:
    second analog generator means for generating a second signal that is analogous to the AC signal;
    third analog generator means for generating a third signal that is analogous to the DC signal; and
    multiplier means for multiplying the second signal with the third signal to obtain to obtain the second reference signal thereby.

4. The converter circuit according to claim 1 wherein the control signal generator means comprises:
    sawtooth generator means for providing a sawtooth signal;
    error amplifier means for obtaining the difference betwen the first reference signal and the second reference signal to obtain an error signal thereby; and
    comparator means for comparing the error signal with the sawtooth signal to obtain the control signal.

5. A method of converting an AC signal to a DC signal comprising the steps of:

controlling the phase and frequency of the current of the AC signal with a controllable converter means that is controlled by a control signal;

generating a first reference signal from the current of the AC signal;

generating a second reference signal from the DC signal and the voltage of the AC signal; and generating the control signal from the first reference signal and the second reference signal.

6. The method according to claim 5 wherein the step of generating the first reference signal comprises:

sensing the current of the AC signal to obtain a sensed current signal;

generating a first reference signal from the sensed current signal that is analogous to the current of the AC signal; and converting the first sensed signal to the first reference signal.

7. The method according to claim 5 wherein the step of generating the second reference signal comprises:

generating a second signal that is analogous to the voltage of the AC signal;

generating a third signal that is analogous to the DC signal; and multiplying the second signal with the third signal to obtain the second reference signal thereby.

8. The method according to claim 5 wherein the step of generating the control signal comprises:

providing a sawtooth signal whose amplitude varies as a function of time;

obtaining the difference between the first reference signal and the second reference signal to obtain an error signal thereby; and comparing the error signal with the sawtooth signal to obtain the control signal.

* * * * *